(12) United States Patent
Takazono et al.

(10) Patent No.: US 12,274,985 B2
(45) Date of Patent: Apr. 15, 2025

(54) POROUS MEMBRANE

(71) Applicant: ASAHI KASEI MEDICAL CO., LTD., Tokyo (JP)

(72) Inventors: Yasutaka Takazono, Tokyo (JP); Masayasu Komuro, Tokyo (JP)

(73) Assignee: ASAHI KASEI MEDICAL CO., LTD., Tokyo (JP)

( * ) Notice: Subject to any disclaimer, the term of this patent is extended or adjusted under 35 U.S.C. 154(b) by 513 days.

(21) Appl. No.: 17/598,654

(22) PCT Filed: Mar. 27, 2020

(86) PCT No.: PCT/JP2020/013889
§ 371 (c)(1),
(2) Date: Sep. 27, 2021

(87) PCT Pub. No.: WO2020/203716
PCT Pub. Date: Oct. 8, 2020

(65) Prior Publication Data
US 2022/0168694 A1    Jun. 2, 2022

(30) Foreign Application Priority Data

Mar. 29, 2019    (JP) .................. 2019-065206

(51) Int. Cl.
| | | |
|---|---|---|
| *B01D 69/02* | (2006.01) | |
| *B01D 67/00* | (2006.01) | |
| *B01D 69/06* | (2006.01) | |
| *B01D 69/10* | (2006.01) | |
| *B01D 71/40* | (2006.01) | |
| *B01D 71/68* | (2006.01) | |
| *D01F 6/76* | (2006.01) | |
| *D06M 15/263* | (2006.01) | |

(52) U.S. Cl.
CPC ......... *B01D 69/02* (2013.01); *B01D 67/0088* (2013.01); *B01D 69/06* (2013.01); *B01D 69/1071* (2022.08); *B01D 71/4011* (2022.08); *B01D 71/68* (2013.01); *D01F 6/76* (2013.01); *D06M 15/263* (2013.01); *B01D 2323/02* (2013.01); *B01D 2325/20* (2013.01); *B01D 2325/36* (2013.01); *B01D 2325/38* (2013.01)

(58) Field of Classification Search
None
See application file for complete search history.

(56) References Cited

U.S. PATENT DOCUMENTS

| | | | |
|---|---|---|---|
| 2006/0016748 A1 | 1/2006 | Koguma et al. | |
| 2007/0082401 A1 | 4/2007 | Wada et al. | |
| 2011/0259816 A1 | 10/2011 | Yokota et al. | |
| 2012/0305472 A1 | 12/2012 | Yokota et al. | |
| 2016/0038884 A1 | 2/2016 | Hikita et al. | |
| 2016/0288056 A1* | 10/2016 | Bergmann | B01D 65/08 |
| 2017/0266626 A1* | 9/2017 | Kayama | B01D 69/00 |
| 2017/0304780 A1 | 10/2017 | Komuro et al. | |
| 2017/0348650 A1 | 12/2017 | Kayama et al. | |
| 2017/0361285 A1 | 12/2017 | Kayama et al. | |
| 2020/0215239 A1 | 7/2020 | Ushiro et al. | |

FOREIGN PATENT DOCUMENTS

| | | |
|---|---|---|
| CA | 2241059 | 7/1997 |
| CN | 201189450 | 2/2009 |
| CN | 105209162 | 12/2015 |
| CN | 108686276 | 10/2018 |
| CN | 109475677 | 3/2019 |
| JP | 9-38473 | 2/1997 |
| JP | 10-151196 | 6/1998 |
| JP | 2001-038170 | 2/2001 |
| JP | 2005-58906 | 3/2005 |
| JP | 2005-329128 | 12/2005 |
| JP | 2005-334377 | 12/2005 |
| JP | 2008-194647 | 8/2008 |
| JP | 2017-148737 | 8/2017 |
| RU | 2657059 | 6/2018 |
| WO | 2004/035180 | 4/2004 |
| WO | 2005/028500 | 3/2005 |
| WO | 2010/074136 | 7/2010 |
| WO | 2013/012024 | 1/2013 |
| WO | 2014/199871 | 12/2014 |
| WO | 2016/031834 | 3/2016 |

(Continued)

OTHER PUBLICATIONS

Masahiro Oda et al., "Discusion on Issues and Cases of Viral Clearance Tests", PDA Journal of GMP and Validation in Japan, vol. 7, No. 1, pp. 44, 2005.

(Continued)

*Primary Examiner* — Krishnan S Menon
(74) *Attorney, Agent, or Firm* — GREENBLUM & BERNSTEIN, P.L.C.

(57) ABSTRACT

The problem is to provide a porous membrane with a reduced phenomenon in which membranes firmly adhere to one another during production of the porous membrane (membrane adhesion). The problem is solved by a porous membrane comprising a hydrophobic polymer and a hydrophilic polymer, wherein an average value T of ratios of the number of counts of ions derived from the hydrophilic polymer to the number of counts of ions derived from the hydrophobic polymer is 1.0 or more when a surface of the porous membrane is measured by time-of-flight secondary ion mass spectrometry (TOF-SIMS).

2 Claims, No Drawings

(56) References Cited

FOREIGN PATENT DOCUMENTS

| WO | 2016/072409 | 5/2016 |
| WO | 2016/113964 | 7/2016 |
| WO | 2016/117565 | 7/2016 |

OTHER PUBLICATIONS

English language International Search Report issued in International Patent Application No. PCT/JP2020/013889, dated Jun. 23, 2020.
English language International Preliminary Report on Patentability issued in International Patent Application No. PCT/JP2020/013889, dated Jun. 23, 2020.
Emma Gracia-Lor et al., "Multi-class determination of personal care products and pharmaceuticals in environmental and wastewater samples by ultra-high performance liquid chromatography-tandem mass spectrometry", Talanta, 2012 (99), pp. 1011-1023, p. 1017, left column 3rd paragraph from above.
Geraldine Coullerez et al., "ToF-SIMS for the characterization of hyperbranched aliphatic polyesters: probing their molecular weight on surfaces based on principal component analysis (PCA)", Surf. Interface Anal., 2003, N35, pp. 693-708, p. 701, left column lines 1-12 from above.
C. Zhao et al., "Progress in Materials Science", 58, 2013, 76-150.
Supplementary European Search Report issued in EP 20785416.7, dated Apr. 19, 2022.

* cited by examiner

POROUS MEMBRANE

TECHNICAL FIELD

The present invention relates to a porous membrane, a method for producing a porous membrane, and a method for reducing membrane adhesion.

BACKGROUND ART

In recent years, medical treatments using fractionated plasma products and biopharmaceuticals as medicines have been widespread because of few side effects and a high treatment effectiveness. However, the fractionated plasma products are derived from human blood, the biopharmaceuticals are derived from animal cells, and therefore there is a risk that pathogenic substances such as viruses are contaminated into medicines.

In order to prevent contamination of viruses into medicines, removal or inactivation of viruses has surely been conducted. Examples of the method for removing or inactivating a virus include heat treatment, optical treatment, and treatment with chemicals. A membrane filtration method that is effective for all the viruses irrespective of their thermal and chemical characteristics has received attention in terms of the problems of protein denaturation, efficiency of inactivating a virus, and contamination of chemicals.

Examples of the virus to be removed or inactivated include: a poliovirus having a diameter of 25 to 30 nm; a parvovirus having a diameter of 18 to 24 nm as the smallest virus; and an HIV virus having a diameter of 80 to 100 nm as a relatively large virus. In recent years, there is a growing need particularly for removal of small viruses such as the parvovirus.

The first performance required for a virus removal membrane is safety. The safety includes safety not allowing the contamination of pathogenic substances such as viruses into fractionated plasma products and biopharmaceuticals and safety not allowing the contamination of foreign materials such as an eluate from a virus removal membrane into fractionated plasma products and biopharmaceuticals.

As the safety not allowing the contamination of pathogenic substances such as viruses, it becomes important to remove viruses sufficiently with a virus removal membrane. In Non-Patent Literature 1, it is said that the clearance (LRV) to be achieved for a minute virus of mice or a porcine parvovirus is 4.

Moreover, as the safety not allowing the contamination of foreign materials such as an eluate, it becomes important not to allow the eluate to come out of a virus removal membrane.

The second performance required for the virus removal membrane is productivity. The productivity means recovering protein, such as albumin of 5 nm size and globulin of 10 nm size, efficiently.

Patent Literature 1 discloses a virus removal method using a porous membrane containing a hydrophobic polymer and a water-insoluble polymer.

Patent Literature 2 discloses a virus removal membrane obtained by hydrophilizing a surface of a membrane by a graft polymerization method, the membrane formed through a thermally induced phase separation method and containing polyvinylidene difluoride (PVDF).

CITATION LIST

Patent Literature

Patent Literature 1: International Publication No. WO 2016031834
Patent Literature 2: International Publication No. WO 2004035180

Non-Patent Literature

Non-Patent Literature 1: PDA Journal of GMP and Validation in Japan, vol. 7, No. 1, p. 44(2005)

SUMMARY OF INVENTION

Technical Problem

A problem to be solved by the present invention is to provide a porous membrane with a reduced phenomenon in which membranes firmly adhere to one another during production of the porous membrane (herein, referred to as "membrane adhesion"). Another problem is to provide a method for reducing membrane adhesion that occurs during production of a porous membrane. Still another problem of the present invention is to provide a porous hollow fiber membrane with reduced membrane adhesion that occurs during production of the porous hollow fiber membrane (hereinafter, membrane adhesion in the porous hollow fiber membrane is sometimes referred to as "fiber adhesion") and to provide a method for reducing membrane adhesion that occurs during production of a porous hollow fiber membrane.

Solution to Problem

The present inventor has found that when a porous membrane is produced by the method disclosed in Patent Literature 1, there is a problem that membrane adhesion occurs in which membranes firmly adhere to one another particularly after hydrophilization of the porous membrane by coating. The present inventor has first realized that occurrence of membrane adhesion in production of a membrane module using a membrane involves operations for tearing the membranes from one another, so that not only the production efficiency of the membrane module is deteriorated, but also there is the risk of damaging the membrane by the tearing operations, resulting in deterioration in performance of the membrane. The inventor found that in particular, when the porous membrane is a hollow fiber membrane, this problem becomes strongly apparent due to occurrence of membrane adhesion in which porous hollow fiber membranes firmly adhere to one another after hydrophilization of the porous hollow fiber membrane by coating which is performed with the porous hollow fiber membranes made into bundle. In this way, the present inventor has found a novel problem of reducing occurrence of membrane adhesion after hydrophilization, which had not been previously known for porous membranes. As a result of conducting diligent studies for the purpose of solving the problem, the present inventor has completed the present invention by finding that a porous membrane with reduced membrane adhesion can be obtained with a specific configuration as shown below.

That is to say, the present invention is as follows.

[1] A porous membrane comprising a hydrophobic polymer and a hydrophilic polymer, wherein an average value T of ratios of the number of counts of ions derived from the hydrophilic polymer to the number of counts of ions derived from the hydrophobic polymer is 1.0 or more when a surface of the porous membrane is measured by time-of-flight secondary ion mass spectrometry (TOF-SIMS).

[2] The porous membrane according to [1], wherein the ion derived from the hydrophobic polymer is $C_6H_4O$ (m/z=92).

[3] The porous membrane according to [1] or [2], wherein the ion derived from the hydrophilic polymer is $C_4H_5O_2$ (m/z=85).

[4] The porous membrane according to any one of [1] to [3], wherein the hydrophilic polymer is a water-insoluble hydrophilic polymer.

[5] The porous membrane according to any one of [1] to [4], wherein the hydrophilic polymer is electrically neutral.

[6] The porous membrane according to any one of [1] to [5], wherein the hydrophilic polymer is a methacrylate-based polymer.

[7] The porous membrane according to [6], wherein the methacrylate-based polymer is polyhydroxyethyl methacrylate.

[8] The porous membrane according to any one of [1] to [7], wherein the hydrophobic polymer is a polysulfone-based polymer.

[9] The porous membrane according to [8], wherein the polysulfone-based polymer is polyethersulfone.

[10] The porous membrane according to any one of [1] to [9], wherein a bubble point is 1.4 to 2.0 MPa.

[11] The porous membrane according to any one of [1] to [10], wherein a pure water permeability is 150 to 500 LI (hr·m²·bar).

[12] The porous membrane according to any one of [1] to [11], for removing viruses.

[13] The porous membrane according to any one of [1] to [12], wherein a viral log reduction value (LRV) is 4 or more.

[14] The porous membrane according to any one of [1] to [13], wherein a base material membrane comprising the hydrophobic polymer is coated with the hydrophilic polymer.

[15] The porous membrane according to any one of [1] to [14], wherein a content of the hydrophilic polymer is 5 to 20 wt % with respect to the hydrophobic polymer.

[16] A method for producing a porous membrane comprising a hydrophobic polymer and a hydrophilic polymer, the method comprising:
a hydrophilization process of hydrophilizing a base material membrane comprising a hydrophobic polymer with a hydrophilic polymer to obtain a hydrophilized porous membrane; and
an adjustment process of treating the hydrophilized porous membrane so that an average value T of ratios of the number of counts of ions derived from the hydrophilic polymer to the number of counts of ions derived from the hydrophobic polymer is 1.0 or more when a surface of the porous membrane is measured by time-of-flight secondary ion mass spectrometry (TOF-SIMS).

[17] A method for reducing membrane adhesion after hydrophilizing a base material membrane comprising a hydrophobic polymer, the method comprising:
a hydrophilization process of hydrophilizing a base material membrane comprising a hydrophobic polymer with a hydrophilic polymer to obtain a hydrophilized porous membrane; and
an adjustment process of treating the hydrophilized porous membrane so that an average value T of ratios of the number of counts of ions derived from the hydrophilic polymer to the number of counts of ions derived from the hydrophobic polymer is 1.0 or more when a surface of the porous membrane is measured by time-of-flight secondary ion mass spectrometry (TOF-SIMS).

[18] The method according to [16] or [17], wherein the adjustment process comprises subjecting the hydrophilized porous membrane to washing and/or high-pressure hot-water treatment.

[19] The method according to any one of [16] to [18], wherein the hydrophilization process comprises a process of making the base material membrane into a bundle and performing hydrophilization treatment.

[20] The porous membrane according to any one of [1] to [15], wherein the porous membrane has:
a dense layer at least in a downstream portion of filtration in the membrane;
a gradient asymmetric structure wherein an average pore diameter of fine pores increases from the downstream portion of filtration toward an upstream portion of filtration; and
a gradient index of the average pore diameter from the dense layer to a coarse layer of 0.5 to 12.0.

[21] The porous membrane according to [20], wherein an existence ratio of pores of 10 nm or smaller in the dense layer is 8.0% or less.

[22] The porous membrane according to [20] or [21], wherein a value of a standard deviation of pore diameters/the average pore diameter in the dense layer is 0.85 or less.

[23] The porous membrane according to any one of [20] to [22], wherein an existence ratio of pores of larger than 10 nm and 20 nm or smaller in the dense layer is 20.0% or more and 35.0% or less.

[24] The porous membrane according to any one of [20] to [23], wherein a porosity in the dense layer is 30.0% or more and 45.0% or less.

[25] The porous membrane according to any one of [20] to [24], wherein a thickness of the dense layer is 1 to 8 μm.

Advantageous Effects of Invention

According to the present invention, a porous membrane with reduced membrane adhesion during production of the porous membrane is provided. This enables not only efficient production of a membrane module but also prevention of deterioration in performance of the porous membrane.

DESCRIPTION OF EMBODIMENTS

Hereinafter, modes for carrying out the present invention (hereinafter, sometimes referred to as "embodiments") will be described. The present invention is not limited to the following embodiments, and various modifications of the embodiments can be carried out within the scope of the gist of the present invention. The embodiments shown below are given as examples of methods for embodying the technical idea of this invention, etc., and the present invention is not limited to these examples.

<Porous Membrane>

In one embodiment, the porous membrane contains a hydrophobic polymer and a hydrophilic polymer, and an average value T of ratios of the number of counts of ions derived from the hydrophilic polymer to the number of counts of ions derived from the hydrophobic polymer is 1.0 or more when a surface of the porous membrane is measured by time-of-flight secondary ion mass spectrometry (TOF-SIMS).

In one embodiment, the porous membrane is not particularly limited as long as it is a porous membrane in which membrane adhesion is improved by setting the above-described average value T on the porous membrane to an appropriate value, and examples of the porous membrane include flat membranes and hollow fiber membranes. Hollow fiber membranes are preferable from the viewpoint of a degree of improvement in membrane adhesion. The hollow fiber membrane has an inner surface and an outer surface as surfaces of the membrane, and the average value T on the outer surface may satisfy 1.0 or more. For the flat membrane, the average value T on one of the two surfaces may be a value in the present invention, and it is preferable that both the two surfaces show a value in the present invention.

In the porous membrane according to the present embodiments, membrane adhesion during production is reduced. This enables not only efficient production of a membrane module but also prevention of deterioration in performance of the porous membrane. In one embodiment, in the porous membrane, lowering of flux with time by adsorption of protein during filtration is suppressed. Further, in one embodiment, the porous membrane has high virus removal performance.

The porous membrane according to the present embodiments contains a hydrophobic polymer and a hydrophilic polymer. The porous membrane is not particularly limited as long as it is a porous membrane containing a hydrophobic polymer and a hydrophilic polymer. The hydrophobic polymer and the hydrophilic polymer may be subjected to blend membrane-forming, and the membrane obtained by the blend membrane-forming (blend membrane) may be further coated with a hydrophilic polymer. The porous membrane also includes membranes in which a base material membrane containing a hydrophobic polymer is hydrophilized with a hydrophilic polymer by, for example, coating or grafting.

Herein, the hydrophobic polymer means a polymer that makes a contact angle more than 90 degrees when PBS (a solution obtained by dissolving 9.6 g of powdered Dulbecco's PBS (-) "Nissui" commercially available from Nissui Pharmaceutical Co., Ltd. in water to make the total amount 1 L) is brought into contact with film of the polymer.

In one embodiment, the hydrophobic polymer is not particularly limited as long as it is a polymer having hydrophobicity, and examples thereof include polyolefins, polyamides, polyimides, polyesters, polyketones, polyvinylidene difluorides (PVDF), polymethyl methacrylates, polyacrylonitriles, and polysulfone-based polymers. Polysulfone-based polymers are preferable from the viewpoint of high membrane-forming properties and control of the membrane structure.

The hydrophobic polymers may be used singly or in mixtures of two or more.

Examples of the polysulfone-based polymer include polysulfones (PSf) having a repeating unit represented by formula 1 below, and polyethersulfones (PES) having a repeating unit represented by formula 2 below, and polyethersulfones are preferable from the viewpoint of membrane-forming properties.

Formula 1

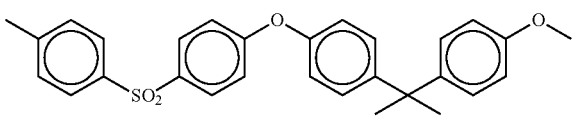

Formula 2

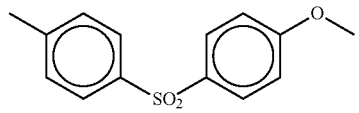

The polysulfone-based polymers may contain a substituent such as a functional group or an alkyl group, or a hydrogen atom in the hydrocarbon skeletons may be substituted by another atom such as a halogen or a substituent in the structures represented by formula 1 and formula 2.

The polysulfone-based polymers may be used singly or in mixtures of two or more.

In one embodiment, the porous membrane contains a hydrophilic polymer.

In one embodiment, the porous membrane may be hydrophilized by allowing the hydrophilic polymer to exist at the surface of fine pores of a base material membrane containing a hydrophobic polymer from the viewpoint of preventing drastic lowering of the filtration speed caused by clogging of the membrane due to adsorption of protein. The base material membrane means a membrane which contains a hydrophobic polymer and is subjected to coating, grafting, or crosslinking. The base material membrane may contain a hydrophilic polymer. For example, the blend membrane may be a base material membrane.

Examples of the method for hydrophilizing a base material membrane include coating, graft reaction, and crosslink reaction after forming the base material membrane containing a hydrophobic polymer. The base material membrane may also be coated with a hydrophilic polymer by coating, graft reaction, crosslink reaction, or the like after subjecting a hydrophobic polymer and a hydrophilic polymer to blend membrane-forming.

Herein, the hydrophilic polymer means a polymer that makes a contact angle 90 degrees or less when PBS (a solution obtained by dissolving 9.6 g of powdered Dulbecco's PBS (-) "Nissui" commercially available from Nissui Pharmaceutical Co., Ltd. in water to make the total amount 1 L) is brought into contact with film of the polymer.

It is preferable that the contact angle is 60 degrees or less, and more preferably 40 degrees or less. In the case where the hydrophilic polymer having a contact angle of 60 degrees or less is contained, the porous membrane is easily wetted with water, and in the case where the hydrophilic polymer having a contact angle of 40 degrees or less is contained, the tendency that the porous membrane is easily wetted with water is further remarkable.

The contact angle means an angle made by a film with a surface of a water droplet when the water droplet is dropped onto a surface of the film, and the contact angle is defined in JIS R3257.

In one embodiment, examples of the hydrophilic polymer include water-insoluble hydrophilic polymers. The term "water-insoluble" means an elution rate of 0.1% or less in the case where a membrane module fabricated so as to have an effective membrane area of 3 cm$^2$ is used for dead-end filtration at a constant pressure of 2.0 bar with 100 mL of pure water of 25° C.

The elution rate is calculated according to the following method.

A filtrate obtained by filtering 100 mL of pure water of 25° C. is collected and concentrated. The amount of carbon is measured using the obtained concentrated liquid with a total organic carbon meter TOC-L (manufactured by Shimadzu Corporation) to calculate the elution rate from the membrane.

Herein, the water-insoluble hydrophilic polymer refers to a substance that satisfies the above-described contact angle and elution rate. The water-insoluble hydrophilic polymers include not only hydrophilic polymers in which the substance itself is water-insoluble but also hydrophilic polymers that are insolubilized to water in a production process thereof even though the hydrophilic polymers are originally water-soluble hydrophilic polymers. That is to say, even though a hydrophilic polymer is a water-soluble hydrophilic polymer, the hydrophilic polymer is included in the water-insoluble hydrophilic polymers in the present embodiments as long as the hydrophilic polymer is a substance that satisfies the above-described contact angle and also satisfies the above-described elution rate in the dead-end filtration at a constant pressure after fabricating a filter as a result of being insolubilized to water in the production process. The water-insoluble hydrophilic polymer obtained by insolubilizing a water-soluble hydrophilic polymer to water in the process of producing a membrane may be, for example, a water-soluble hydrophilic polymer that is insolubilized to water in such a way that a base material membrane of a hydrophobic polymer is coated with a water-soluble hydrophilic polymer obtained by copolymerizing a monomer having an azido group in a side chain thereof and a hydrophilic monomer such as 2-methacryloyloxyethyl phosphorylcholine and thereafter the resultant base material membrane is subjected to heat treatment, thereby covalently bonding the water-soluble hydrophilic polymer to the base material membrane. Moreover, a hydrophilic monomer such as a 2-hydroxyalkyl acrylate may also be graft-polymerized to a base material membrane of a hydrophobic polymer.

It is preferable that the hydrophilic polymer is electrically neutral in view of preventing adsorption of protein as a solute.

In the present embodiments, the term "electrically neutral" means "not having a charge within a molecule" or means that the amount of cations and the amount of anions are equal within a molecule.

Examples of the hydrophilic polymer include vinyl-based polymers.

Examples of the vinyl-based polymer include: homopolymers of hydroxyethyl methacrylate, hydroxypropyl methacrylate, dihydroxyethyl methacrylate, diethylene glycol methacrylate, triethylene glycol methacrylate, polyethylene glycol methacrylate, vinylpyrrolidone, acrylamide, dimethylacrylamide, glucoxyoxyethyl methacrylate, 3-sulfoprpyl methacryloxyethyl dimethylammonium betaine, 2-methacryloyloxyethyl phosphorylcholine, 1-carboxydimethyl methacryloyloxyethyl methane ammonium, or the like; and random copolymers, graft type copolymers, and block type copolymers of a hydrophobic monomer such as styrene, ethylene, propylene, propyl methacrylate, butyl methacrylate, ethylhexyl methacrylate, octadecyl methacrylate, benzyl methacrylate, or methoxyethyl methacrylate, and a hydrophilic monomer such as hydroxyethyl methacrylate, hydroxypropyl methacrylate, dihydroxyethyl methacrylate, diethylene glycol methacrylate, triethylene glycol methacrylate, polyethylene glycol methacrylate, vinylpyrrolidone, acrylamide, dimethylacrylamide, glucoxyoxyethyl methacrylate, 3-sulfopropyl methacryloxyethyl dimethylammonium betaine, 2-methacryloyloxyethyl phosphorylcholine, or 1-carboxydimethyl methacryloyloxyethyl methane ammonium. Methacrylate-based polymers are preferable, and polyhydroxyethyl methacrylate is more preferable.

Moreover, examples of the vinyl-based polymer also include copolymers of a cationic monomer such as dimethylaminoethyl methacrylate or diethylaminoethyl methacrylate, an anionic monomer such as acrylic acid, methacrylic acid, vinylsulfonic acid, sulfopropyl methacrylate, or phosphoxyethyl methacrylate, and the above-described hydrophobic monomer, and the vinyl-based polymer may also be a polymer containing equal amounts of anionic monomers and cationic monomers so as to be electrically neutral.

Examples of the hydrophilic polymer also include cellulose being a polysaccharide and cellulose triacetate being a derivative of cellulose. Moreover, the polysaccharides and derivatives thereof include materials obtained by subjecting hydroxy alkyl cellulose or the like to crosslinking treatment.

The hydrophilic polymers may be polyethylene glycols and derivatives thereof, block copolymers of ethylene glycol and the above-described hydrophobic monomer, random copolymers or block copolymers of ethylene glycol and propylene glycol, ethyl benzyl glycol, or the like. Moreover, the polyethylene glycols and the above-described copolymers may be insolubilized to water by substituting one end or both ends thereof with a hydrophobic group.

Examples of the compound obtained by substituting one end or both ends of polyethylene glycols with a hydrophobic group include α, ω-dibenzyl polyethylene glycols and α, ω-didodecyl polyethylene glycols, and the compound may be, for example, a copolymer of a polyethylene glycol and a hydrophobic monomer such as a dichlorodiphenyl sulfone having a halogen group at both ends within the molecule thereof.

Examples of the hydrophilic polymer also include polyethylene terephthalates and polyethersulfones, which are obtained through polycondensation and which are hydrophilized by substituting hydrogen atoms in the main chain of the polyethylene terephthalates and polyethersulfones with hydrophilic groups. In the hydrophilized polyethylene terephthalates, polyethersulfones, and the like, hydrogen atoms in the main chain may be substituted by anionic groups or cationic groups, or the amount of the anionic groups and the amount of the cationic groups may be equal.

The hydrophilic polymer may be a polymer obtained by ring-opening an epoxy group in a bisphenol A type or novolak type epoxy resin, or by introducing a vinyl polymer, a polyethylene glycol, or the like in an epoxy group.

Moreover, the hydrophilic polymer may be those subjected to silane coupling.

The hydrophilic polymers may be used singly or in mixtures of two or more.

As the hydrophilic polymer, homopolymers of hydroxyethyl methacrylate, hydroxypropyl methacrylate, or dihydroxyethyl methacrylate; and random copolymers of a hydrophilic monomer such as 3-sulfopropyl methacryloxyethyl dimethyl ammonium betaine, 2-methacryloyloxyethyl phosphorylcholine, or 1-carboxydimethyl methacryloyloxyethyl methane ammonium, and a hydrophobic monomer such as butyl methacrylate or ethylhexyl methacrylate are preferable from the viewpoint of easiness of production, and homopolymers of hydroxyethyl methacrylate or hydroxypropyl methacrylate; and random copolymers of a hydrophilic monomer such as 3-sulfopropyl methacryloxyethyl dimethyl ammonium betaine or 2-methacryloyloxyethyl phosphorylcholine, and a hydrophobic monomer such as butyl methacrylate or ethylhexyl methacrylate are more preferable from the viewpoint of easiness of selection of a solvent for a coating liquid, dispersibility in the coating liquid, and operability in conducting coating with the hydrophilic polymer.

The content of the hydrophilic polymer is not particularly limited as long as membrane adhesion does not occur during production of the porous membrane. From the viewpoint of water-permeable performance or virus removal performance, examples of the lower limit of the content of the hydrophilic polymer with respect to the hydrophobic polymer are 5 wt % or more, 6 wt % or more in another aspect, 7 wt % or more in another aspect, 8 wt % or more in still another aspect, 9 wt % or more in still another aspect, and 10 wt % or more in still another aspect. Moreover, examples of the upper limit of the content of the hydrophilic polymer with respect to the hydrophobic polymer are 20 wt % or less, 19 wt % or less in another aspect, 18 wt % or less in still another aspect, 17 wt % or less in still another aspect, 16 wt % or less in still another aspect, 15 wt % or less in still another aspect, and 14 wt % or less in still another aspect. The ratio of the hydrophilic polymer to the hydrophobic polymer (=weight of hydrophilic polymer/weight of hydrophobic polymer×100) in the porous membrane hydrophilized by coating may be called a coating ratio. The "weight of hydrophilic polymer" in the calculation expression of the coating ratio is the weight of the hydrophilic polymer with which the base material membrane is coated, and does not include the weight of the hydrophilic polymer incorporated in the base material membrane during formation of the blend membrane of the hydrophobic polymer and the hydrophilic polymer.

The porous membrane according to the present embodiments or the base material membrane in the present embodiments may be a membrane obtained by subjecting a hydrophilic polymer and a hydrophobic polymer to blend membrane-forming.

The hydrophilic polymer for use in blend membrane-forming is not particularly limited as long as the hydrophilic polymer is compatible with a good solvent together with a hydrophobic polymer, but copolymers containing a polyvinylpyrrolidone or vinylpyrrolidone are preferable as the hydrophilic polymer.

Specific examples of the polyvinylpyrrolidone include LUVITEC (trade name) K 60, K 80, K 85, and K 90, all commercially available from BASF SE, and LUVITEC (trade name) K 80, K 85, and K 90 are preferable.

As the copolymer containing vinylpyrrolidone, copolymers of vinylpyrrolidone and vinyl acetate are preferable in view of compatibility with hydrophobic polymers and suppression of interaction of protein to the membrane surface.

It is preferable that the copolymerization ratio of vinylpyrrolidone to vinyl acetate is 6:4 to 9:1 from the viewpoint of adsorption of protein to the membrane surface and interaction with polysulfone-based polymers in the membrane.

Specific examples of the copolymer of vinylpyrrolidone and vinyl acetate include LUVISKOL (trade name) VA 64 and VA 73, all commercially available from BASF SE.

The hydrophilic polymers may be used singly or in mixtures of two or more.

In one embodiment, washing with hot water after blend membrane-forming is preferable in the case where a water-soluble hydrophilic polymer is used in blend membrane-forming from the viewpoint of suppressing elution of foreign matter from the membrane during filtration. As a result of washing, hydrophilic polymers which are insufficiently entangled with hydrophobic polymers are removed from the membrane and the elution during filtration is suppressed.

As the washing with hot water, hot-water treatment at a high pressure or warm water treatment after coating may be conducted.

In one embodiment, an average value T of ratios of the number of counts of hydrophilic polymer-derived ions to the number of counts of hydrophobic polymer-derived ions in the porous membrane is, for example, 1.0 or more when a surface of the membrane is measured by time-of-flight secondary ion mass spectrometry (TOF-SIMS).

When the average value T is 1.0 or more, membrane adhesion is reduced. For example, when the hydrophobic polymer is a polysulfone-based polymer and the hydrophilic polymer is a methacrylate-based polymer, examples of the mechanism for reduction of membrane adhesion include a mechanism in which when the average value T is 1.0 or more, many hydroxyl groups in the methacrylate-based polymer are located closer to the surface of the membrane as compared to a case where the average value T is less than 1.0, and water molecules in the air bind to the hydroxyl groups oriented to the surface side, so that a layer of water molecules is formed on the surface to avoid firm adhesion of membranes or entanglement of polymers.

The average value T is measured according to the method described as "Measurement of Ratio of Number of Counts of Ions" in Examples.

As the hydrophobic polymer-derived ion to be counted, an ion that is most representative of the hydrophobic polymer is selected, and used as a detection ion to detect a spectrum. As the detection ion, for example, $C_6H_4O$ (m/z=92) can be used in the case of polyethersulfone, and $C_3F$ (m/z=55) or $C_4F$ (m/z=67) can be used in the case of PVDF. Examples of the criteria for selection of ions of concern include ions that are not identical to those of other components forming the membrane, and ions that reflect the characteristics of a substance.

As the hydrophilic polymer-derived ion to be counted, an ion that is most representative of the hydrophilic polymer is selected, and used as a detection ion to perform detection. As the detection ion, for example, $C_4H_5O_2$ (m/z=85) can be used in the case of polyhydroxyethyl methacrylate, $C_4H_6NO$ (m/z=84) can be used in the case of polyvinylpyrrolidone, and $C_2H_3O_2$ (m/z=59) can be used in the case of polyvinyl acetate.

In one embodiment, the average value T is not particularly limited as long as it is a value allowing membrane adhesion to be reduced during production of the membrane. Examples of the upper limit of the average value T are 7.0 or less, 6.0 or less, 5.0 or less, 4.0 or less, 3.0 or less, and 2.0 or less, and examples of the lower limit of the average value T are 1.0 or more, 1.5 or more, 2.0 or more, and 2.5 or more.

In one embodiment, membrane adhesion during production is reduced in the porous membrane. In particular, membrane adhesion after hydrophilization treatment of the porous membrane is reduced. The degree of reduction of membrane adhesion is not particularly limited. For example, the degree of reduction of membrane adhesion is not particularly limited as long as membrane adhesion is reduced to the extent that a process for tearing the membranes is not necessary during production of the membrane module. For example, it can be determined that membrane adhesion is reduced when 4% of the membranes forming the membrane bundle can be collected without resistance from the membrane bundle hydrophilized with the membranes made into a bundle.

In one embodiment, the porous membrane has a gradient asymmetric structure. The gradient asymmetric structure is a structure in which the average pore diameter of fine pores increases from the downstream portion of filtration in the membrane toward the upstream portion of filtration. The porous membrane may have a general tendency that the average pore diameter of fine pores increases from the downstream portion of filtration in the membrane toward the upstream portion of filtration in the thickness direction, and the average pore diameter may locally and slightly reverse due to structural unevenness or measurement errors. The gradient index of the average pore diameter from the dense layer to the coarse layer is 0.5 to 12.0.

Herein, when liquid is fed to the inner surface side of the porous membrane, a range that reaches 10% of the membrane thickness from the inner surface is the upstream portion of filtration, and a range that reaches 10% of the membrane thickness from the outer surface is the downstream portion of filtration.

Herein, in the porous membrane, a visual field having an average pore diameter of 50 nm or smaller is defined as a dense layer, and a visual field having an average pore diameter of larger than 50 nm is defined as a coarse layer.

Herein, the dense layer and coarse layer of the porous membrane are determined by taking images of the cross-sectional surface of a membrane with a scanning electron microscope (SEM). For example, a visual field is set horizontally to the membrane thickness direction at an arbitrary portion of the cross-sectional surface of the membrane with 50,000 magnifications. After taking the image of the one visual field that is set, the visual field for taking an image is moved horizontally to the membrane thickness direction and then the image of the next visual field is taken. By repeating the operation of taking an image, photographs of the cross-sectional surface of the membrane are taken without any space, and the photographs thus obtained are connected to obtain one photograph of the cross-sectional surface of the membrane. In this photograph of the cross-sectional surface, the average pore diameter in a range of (2 μm in a perpendicular direction to the membrane thickness direction)×(1 μm from the downstream surface of filtration toward the upstream surface side of filtration in the membrane thickness direction) is calculated every micrometer from the downstream surface of filtration toward the upstream surface side of filtration.

Herein, the average pore diameter is calculated by a method using image analysis. Specifically, pore portions and solid portions are subjected to binarization with Image-pro plus manufactured by Media Cybernetics, Inc. The pore portions and the solid portions are discriminated based on brightness, the sections that cannot be discriminated or noise is corrected with a free-hand tool. An edge section that forms a contour of a pore portion and a porous structure observed in the back of a pore portion are discriminated as a pore portion. After the binarization, a pore diameter is calculated from a value of an area of one pore assuming that the shape of the pore is a perfect circle. The calculation is conducted for every pore to calculate an average pore diameter for every 1 μm×2 μm range. It is to be noted that discontinuous pore portions at the ends of the visual fields are also counted.

The gradient index of the average pore diameter from the dense layer to the coarse layer is calculated based on the first visual field as defined as a dense layer and the second visual field as defined as a coarse layer, the second visual field being adjacent to the first visual field. A place appears where a visual field is transferred from a visual field having an average pore diameter of 50 nm or smaller, the visual field defined as a dense layer, to a visual field having an average pore diameter of larger than 50 nm, the visual field defined as a coarse layer. The gradient index is calculated using the adjacent visual fields of a dense layer and a coarse layer. Specifically, the gradient index of the average pore diameter from a dense layer to a coarse layer can be calculated from the expression given below. Gradient index of average pore diameter from dense layer to coarse layer (nm/μm)=(average pore diameter of coarse layer (second visual field) (nm)–average pore diameter of dense layer (first visual field) (nm))/1 (μm)

In one embodiment, the porous membrane has a dense layer and a coarse layer. In one embodiment, the porous membrane has a coarse layer on the upstream surface side of filtration with respect to a dense layer, and the dense layer and the coarse layer are adjacent to each other.

In one embodiment, the porous membrane has a coarse layer in the inner surface portion and a dense layer in the outer surface portion. Here, the inner surface portion is the upstream portion of filtration, and the outer surface portion is the downstream portion of filtration.

In one embodiment, the dense layer is not particularly limited as long as it exists in at least the downstream portion of filtration. For example, there may be a start point of the dense layer in the downstream portion of filtration, and an end point of the dense layer at a position above the downstream portion of filtration to the upstream surface side of filtration.

In one embodiment, the thickness of the dense layer is not particularly limited as long as it is a thickness allowing viruses to be removed, and examples of the thickness of the dense layer are 1 to 10 μm, 1 to 8 μm in another aspect, and 2 to 8 μm in another aspect.

In the porous membrane in one embodiment, it is preferable that the existence ratio (%) of fine pores of 10 nm or smaller in the dense layer is 8.0% or less, and more preferably 5.0% or less.

The existence ratio (%) of fine pores of 10 nm or smaller in the dense layer refers to the average of the values calculated using the expression given below for all of the visual fields defined as the dense layer from the analysis of the SEM images.

(Total number of fine pores having pore diameter of 10 nm or smaller in one visual field defined as dense layer/total number of fine pores in the same visual field)×100

In the porous membrane in one embodiment, it is preferable that the existence ratio (%) of fine pores of larger than 10 nm and 20 nm or smaller in the dense layer is 20.0% or more and 35.0% or less.

The existence ratio (%) of fine pores of larger than 10 nm and 20 nm or smaller in the dense layer refers to the average of the values calculated using the expression given below for all of the visual fields defined as the dense layer from the analysis of the SEM images.

(Total number of fine pores having pore diameter of larger than 10 nm and 20 nm or smaller in one visual field defined as dense layer/total number of fine pores in the same visual field)×100

In the porous membrane in one embodiment, it is preferable that the porosity (%) in the dense layer is 30.0% or more and 45.0% or less.

The porosity (%) in the dense layer refers to the average of the values calculated using the expression given below for all of the visual fields defined as the dense layer from the analysis of the SEM images.

(Total area of pores in one visual field defined as dense layer/area of the same visual field)×100

In order to realize the collection of protein in a highly efficient manner while maintaining the virus removal performance, it is also important that the standard deviation of pore diameters/the average pore diameter in the dense layer be small. When the standard deviation of pore diameters/the average pore diameter in the dense layer is small, the number of existing excessively large pores and the number of existing excessively small pores are small. According to studies conducted by the present inventors, in order to realize the suppression of blocking of pores due to protein monomers in the dense layer and the collection of protein in a highly efficient manner while maintaining the virus-capturing capability, it is preferable that the standard deviation of pore diameters/the average pore diameter in the dense layer is 0.85 or less, and more preferably 0.70 or less.

In one embodiment, the porous membrane can be used for filtering a protein solution. Specifically, for example, viruses contained in the protein solution can be removed by the filtration. Here, the pure water permeability is a standard for the flux being the filtration speed of a protein solution. The filtration speed of a protein solution becomes higher as the pure water permeability becomes higher although the filtration speed of the protein solution is lower than the pure water permeability because the solution viscosity of the protein solution is higher than the viscosity of pure water. Thus, in one embodiment, a protein-treating membrane that can realize the collection of protein in a more highly efficient manner can be prepared by making the pure water permeability high.

The virus removal mechanism in a virus removal membrane is considered to be as follows. A solution containing a virus permeates through a virus removal layer in which a plurality of virus capturing planes each being perpendicular to the permeation direction are stacked. The distribution always exists in the pore size of the virus-capturing planes, and the virus is captured at a pore having the size smaller than the virus. In this case, the virus capturing rate is low in one surface, but when a plurality of surfaces are stacked, a high virus removal performance is achieved. For example, even though the virus capturing ratio is 20% in one plane, when 50 layers of the planes are stacked, the whole virus capturing rate becomes 99.999%. Many viruses are captured in a region where the average pore diameter is 50 nm or smaller.

In one embodiment, it is preferable that the pure water permeability of the protein-treating membrane is 150 to 500 LI (hr·m²·bar).

When the pure water permeability is 150 LI (hr·m²·bar) or more, the collection of protein in a highly efficient manner can be realized. Moreover, when the pure water permeability is 500 L/(hr·m²·bar) or less, a sustainable virus removal performance can be exhibited.

Herein, the pure water permeability is measured according to the method described as "Measurement of Water Permeability" in Examples.

In one embodiment, that the porous membrane is constituted from a hydrophobic polymer that is hydrophilized by a hydrophilic polymer can be realized by the above-described method.

In the present embodiments, the bubble point (BP) means a pressure at which a bubble is generated from the downstream surface side of filtration when pressure is being applied with air from the upstream surface of filtration in the membrane immersed with hydrofluoroether. When the air permeates through the membrane immersed with a solvent, the air permeates through a pore at a higher applied pressure as the diameter of the pore is smaller. The maximum pore diameter of a membrane can be evaluated by evaluating the pressure when the air permeates for the first time.

The relation between the bubble point and the maximum pore diameter is given below.

$$D_{BP} = 4\gamma \cdot \cos\theta / BP$$

where $D_{BP}$ represents the maximum diameter, $\gamma$ represents a surface tension (N/m) of a solvent, $\cos\theta$ represents a contact angle (-) between the solvent and the membrane, and BP represents a bubble point (MPa).

It is preferable that a parvovirus clearance of the porous membrane is 4 or more, and more preferably 5 or more as LRV in the case where the porous membrane is used as a virus removal membrane. It is preferable that the parvovirus is porcine parvovirus (PPV) from the viewpoint of similarity to viruses contaminated in the actual purification process and easiness of operation.

The maximum pore diameter of the membrane relates to the LRV, and the virus removal performance becomes higher as the bubble point becomes higher, but, in order to allow the virus removal performance to exhibit while maintaining permeability of protein being a useful component, or from the viewpoint of controlling the pure water permeability, it is preferable that the bubble point is 1.40 to 2.00 MPa, more preferably to 1.40 to 1.80 MPa, still more preferably 1.50 to 1.80 MPa, and still more preferably 1.60 to 1.80 MPa.

In the present embodiments, the bubble point is measured according to the method described as "Measurement of Bubble Point" in Examples.

The parvovirus clearance is measured according to the method described as "Measurement of Porcine Parvovirus Clearance" in Examples.

<Method for Producing Porous Membrane and Method for Reducing Membrane Adhesion>

One embodiment is a method for producing a porous membrane containing a hydrophobic polymer and a hydrophilic polymer, the method comprising:

a hydrophilization process of hydrophilizing a base material membrane with a hydrophilic polymer to obtain a hydrophilized porous membrane, the base material membrane containing a hydrophobic polymer; and an adjustment process of treating the hydrophilized porous membrane so that an average value T of ratios of the number of counts of ions derived from the hydrophilic polymer to the number of counts of ions derived from the hydrophobic polymer is 1.0 or more when a surface of the porous membrane is measured by time-of-flight secondary ion mass spectrometry (TOF-SIMS).

One embodiment is a method for reducing membrane adhesion after hydrophilizing a base material membrane containing a hydrophobic polymer, the method comprising:

a hydrophilization process of hydrophilizing a base material membrane with a hydrophilic polymer to obtain a hydrophilized porous membrane, the base material membrane containing a hydrophobic polymer; and an adjustment process of treating the hydrophilized porous membrane so that an average value T of ratios of the number of counts of ions derived from the hydrophilic polymer to the number of counts of ions derived from the hydrophobic polymer is 1.0 or more when a surface of the porous membrane is measured by time-of-flight secondary ion mass spectrometry (TOF-SIMS).

In one embodiment, the hydrophilization process is a process of coating the base material membrane as described below. In one embodiment, the adjustment process is a washing process and/or a high-pressure hot-water treatment process on the coated base material membrane as described below. Only one of the washing process and the high-pressure hot-water treatment process may be conducted, or both of these processes may be conducted.

Hereinafter, specific examples of the method for producing a porous membrane and the method for reducing membrane adhesion will be described.

In one embodiment, while there is no particular limitation, for example, the porous membrane can be produced as follows. Simultaneously, membrane adhesion can be reduced. Hereinafter, description is made taking as an example a case where a polysulfone-based polymer is used as a hydrophobic polymer.

For example, in the case of a hollow fiber membrane, a solution obtained by mixing and dissolving a polysulfone-based polymer, a solvent, and a non-solvent, and then degassing the resultant mixture is used as a membrane-forming dope. The membrane-forming dope is ejected simultaneously with a bore liquid from an annular portion and a central portion of a double tube nozzle (spinneret) respectively, and is introduced into a coagulation bath through an air gap portion to form a membrane. The obtained membrane is wound after washing with water, is subjected to removal of liquid in the hollow portion and then heat treatment, and is dried. Thereafter, the resultant membrane is subjected to hydrophilization treatment.

In the case of a flat membrane, for example, a solution obtained by mixing and dissolving a polysulfone-based polymer, a solvent, and a non-solvent, and then degassing the resultant mixture is used as a membrane-forming dope. From the membrane-forming dope, a membrane is formed through a typical process known in the art. In one typical process, the membrane-forming dope is cast onto a support, and the cast membrane is introduced into a non-solvent to induce phase separation. The membrane is then put in a solvent that is a non-solvent for the polymer (e.g. water, alcohol or a mixture thereof), the solvent is removed, and the membrane is dried, whereby a porous membrane can be obtained. Thereafter, the obtained membrane is subjected to hydrophilization treatment.

As the solvent for use in the membrane-forming dope, a wide range of solvents can be used as long as the solvent is a good solvent for polysulfone-based polymers, such as N-methyl-2-pyrrolidone (NMP), N,N-dimethylformamide (DMF), N,N-dimethylacetoamide (DMAc), dimethyl sulfoxide, or ε-caprolactam, but amide-based solvents such as NMP, DMF, and DMAc are preferable, and NMP is more preferable.

It is preferable to add a non-solvent to the membrane-forming dope. Examples of the non-solvent for use in the membrane-forming dope include glycerin, water, and diol compounds, and the diol compounds are preferable.

The diol compound refers to a compound having a hydroxy group at both ends of the molecule, and as the diol compound, a compound which is represented by formula 3 given below and which has an ethylene glycol structure having a number of repeating unit n of 1 or more is preferable.

Examples of the diol compound include diethylene glycol (DEG), triethylene glycol (TriEG), tetraethylene glycol (TetraEG), and polyethylene glycols (PEGs) are preferable, and DEG, TriEG, and TetraEG are preferable, and TriEG is more preferable.

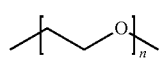

Formula 3

The detailed mechanism is not clear, but addition of the non-solvent into the membrane-forming dope increases the viscosity of the membrane-forming dope to suppress the diffusion rate of the solvent and non-solvent in the coagulation liquid, thereby making it easy to control coagulation and a preferable structure as a porous membrane, and therefore is suitable for forming a desired structure.

It is preferable that the ratio of solvent/non-solvent in the membrane-forming dope is 20/80 to 80/20 based on a mass ratio.

It is preferable that the concentration of the polysulfone-based polymer in the membrane-forming dope is 15 to 35% by mass, and more preferably 20 to 30% by mass in view of membrane strength and permeation performance.

The membrane-forming dope is obtained by dissolving a polysulfone-based polymer, a good solvent, and a non-solvent under stirring at a constant temperature. Since tertiary or lower nitrogen-containing compounds (NMP, DMF, DMAc) are oxidized in the air, and the oxidation further easily progresses when the compounds are warmed, it is preferable that the temperature at the time of dissolving the compounds is 80° C. or lower. Moreover, it is preferable that the membrane-forming dope is prepared in an inert gas atmosphere or under vacuum. Examples of the inert gas include nitrogen and argon, and nitrogen is preferable from the viewpoint of production costs.

It is preferable that the membrane-forming dope is defoamed in view of suppression of defect formation after membrane-forming, and prevention of fiber breakage during spinning in the case of a hollow fiber membrane.

A degassing process can be conducted in the manner as follows. The pressure of the inside of a tank containing a completely dissolved membrane-forming dope is reduced to 2 kPa, and the membrane-forming dope is left to stand for 1 hour or longer. The operation is repeated 7 times or more. The solution may be stirred during degassing in order to enhance degassing efficiency.

(Method for Producing Hollow Fiber Membrane)

Using the above-described membrane-forming dope, a hollow fiber membrane is formed through the following processes.

It is preferable that foreign matter is removed from the membrane-forming dope before being ejected from the spinneret. Removing the foreign matter can prevent fiber breakage during spinning and control the structure of the membrane. It is preferable to install a filter before the membrane-forming dope is ejected from the spinneret also for preventing the foreign matter from contaminating from a packing of the dope tank etc. Filters having different pore diameters may be installed in a multistage configuration, and is not particularly limited, for example, it is suitable to install a mesh filter having a pore diameter of 30 μm and a mesh filter having a pore diameter of 10 μm in this order from the position nearer to a tank for the membrane-forming dope.

As for the composition of the bore liquid for use in membrane-forming, it is preferable to use the same component as used in the good solvent for use in the membrane-forming dope or the coagulation liquid.

For example, when NMP is used as a solvent for the membrane-forming dope and NMP/water are used as a good solvent/a non-solvent for the coagulation liquid, it is preferable that the bore liquid is constituted from NMP and water.

When the amount of the solvents in the bore liquid becomes large, an effect of delaying the progress of coagulation to allow the membrane structure formation to progress slowly is exhibited, and when the amount of water becomes large, an effect of accelerating the progress of coagulation is exhibited. In order to facilitate the progress of coagulation appropriately to control the membrane structure, thereby obtaining a preferable membrane structure for a porous membrane, it is preferable that the ratio of good solvent/water in the bore liquid is 60/40 to 80/20 based on a mass ratio.

It is preferable that the temperature of the spinneret is 25 to 50° C. in order to obtain appropriate pore diameters.

The membrane-forming dope is introduced into the coagulation bath through the air gap portion after being ejected from the spinneret. It is preferable that the detention time in the air gap portion is 0.02 to 1.0 seconds. By setting the detention time to 0.02 seconds or longer, coagulation before introduction to the coagulation bath is made sufficient and the pore diameters can be made appropriate. By setting the detention time to 1.0 seconds or shorter, excessive progress of coagulation can be prevented, and precise control of the membrane structure in the coagulation bath can be achieved.

Moreover, it is preferable that the air gap portion is sealed. The detailed mechanism is not clear, but it is considered that, by sealing the air gap portion, a steam atmosphere of water and a good solvent is formed in the air gap portion to allow the phase separation to progress slowly before the membrane-forming dope is introduced into the coagulation bath, thereby suppressing formation of excessively small pores and making the CV value of pore diameters small.

The spinning speed is not particularly limited as long as the spinning speed satisfies the condition under which a membrane without a defect can be obtained, but in order to make a liquid exchange between the membrane and the coagulation bath in the coagulation bath slow and control the membrane structure, it is preferable that the spinning speed is slow as much as possible. Accordingly, the spinning speed is preferably 4 to 15 m/min from the viewpoint of productivity and solvent exchange.

A draft ratio refers to a ratio of a take-over speed to a linear speed of membrane-forming dope ejection from the spinneret. A high draft ratio means that the draw ratio after the membrane-forming dope is ejected from the spinneret is high.

Generally, in the case where a membrane is formed using a wet phase separation method, the membrane structure is almost determined when a membrane-forming dope comes out of a coagulation bath through an air gap portion. The inside of the membrane is configured of solid portions formed by entanglement of polymer chains and pore portions where a polymer does not exist. The detailed mechanism is not clear, but when the membrane is excessively drawn before coagulation is completed, in other words, when the membrane is excessively drawn before the polymer chains become entangled, the entanglements of polymer chains are torn off, and pore portions are connected and, as a result, excessively large pores are formed, or pore portions are divided and, as a result, excessively small pores are formed. The excessively large pores become a cause of leakage of viruses, and the excessively small pores become a cause of clogging.

It is preferable that the draft ratio is made small as much as possible in view of structure control, and the draft ratio is preferably 1.1 to 6, and more preferably 1.1 to 4.

The membrane-forming dope passes through the filter and the spinneret, is moderately coagulated in the air gap portion, and is thereafter introduced into the coagulation liquid. The detailed mechanism is not clear, but it is considered that, by making the spinning speed slow, a fluid film formed at the interface between the outer surface of the membrane and the coagulation liquid becomes thick and the liquid exchange at this interface occurs slowly, thereby allowing coagulation to progress slowly as compared with the coagulation in the case where the spinning speed is fast, and therefore the inclination of the average pore diameter from the dense layer to the coarse layer becomes gentle.

The good solvent has an effect of delaying coagulation, water has an effect of accelerating coagulation, and therefore, in order to allow coagulation to progress at an appropriate speed to make the thickness of the dense layer adequate, thereby obtaining a membrane having a preferable pore diameter, it is preferable that the ratio of good solvent/water as the coagulation liquid composition is 50/50 to 5/95 based on a mass ratio.

It is preferable that the temperature of the coagulation bath is 10 to 40° C. in view of pore diameter control.

The membrane pulled up from the coagulation bath is washed with warm water.

In the washing process with water, it is preferable to make sure to remove the good solvents and non-solvents. When the membrane is dried while containing a solvent, the solvent is concentrated in the membrane during drying and a polysulfone-based polymer is dissolved or swollen. As a result, there is a possibility that the membrane structure is changed.

In order to increase the diffusion rate of the solvents and non-solvents to be removed and increase washing efficiency with water, it is preferable that the temperature of the warm water is 50° C. or higher.

In order to conduct washing with water sufficiently, it is preferable that the detention time of the membrane in the bath for washing with water is 10 to 300 seconds.

The membrane pulled up from the bath for washing with water is wound to a reel with a winder. In this case, when the membrane is wound in the air, the membrane becomes gradually dried, and the membrane may shrink only slightly. In order to make the membrane structures same to prepare uniform membranes, it is preferable that the membranes are wound in water.

Both ends of the membrane wound to the reel are cut, and the membrane is then made into a bundle and is held by a support not to loosen. The membrane thus held is washed by feeding liquid in a particle removal process.

In the hollow portion of the membrane wound to the reel, a white-clouded liquid is left. In the liquid, polysulfone-based polymer particles having a size of nanometers to micrometers are suspended. When the membrane is dried without removing the white-clouded liquid, the particles may block the pores of the membrane to lower the membrane performance, and therefore it is preferable to remove liquid in the hollow portion in the particle removal process.

In a water immersion process, good solvents and non-solvents contained in the membrane are removed by diffusion.

It is preferable that in the water immersion process, the temperature of water is 10 to 30° C. and the immersion time is 30 to 120 minutes.

It is preferable that water for the immersion is exchanged several times.

It is preferable that the wound membrane is subjected to high-pressure hot-water treatment. Specifically, it is preferable that the membrane is placed in a high-pressure steam sterilizer in a state where the membrane is completely immersed in water, and is subjected to treatment for 2 to 6 hours at 120° C. or higher. The detailed mechanism is not clear, but not only the solvents and non-solvents slightly left in the membrane are completely removed but also the entanglements and state of existence of the polysulfone-based polymers in the dense layer region are optimized by the high-pressure hot-water treatment.

A base material membrane containing a polysulfone-based polymer is completed by drying the membrane subjected to high-pressure hot-water treatment. The drying method such as air drying, drying under reduced pressure, or hot-air drying is not particularly limited, but it is preferable that the membrane is dried in a state where both ends thereof are fixed so that the membrane does not shrink during drying.

In one embodiment, the base material membrane becomes a porous hollow fiber membrane through a coating process.

For example, in the case where hydrophilization treatment is conducted by coating, the coating process includes: immersing process of immersing a base material membrane in a coating liquid; deliquoring process for deliquoring extra coating liquid from the immersed base material membrane; and drying process of drying the deliquored base material membrane. Moreover, a process of washing the membrane may be provided before and after the drying process.

In the immersing process, the base material membrane is immersed in a hydrophilic polymer solution in a bundled state. The solvent of the coating liquid is not particularly limited as long as the solvent is a good solvent for the hydrophilic polymer and is also a poor solvent for polysulfone-based polymers, but alcohols are preferable.

It is preferable that the lower limit of the concentration of the hydrophilic polymer in the coating liquid is 0.5% by mass or more from the viewpoint of suppressing the lowering of the flux with time due to the adsorption of protein during filtration by sufficiently coating the pore surface of the base material membrane with the hydrophilic polymer. The upper limit of the concentration is not particularly limited as long as membrane adhesion is reduced, but it is preferable that the upper limit of the concentration is 20.0% by mass or less, and preferably 10.0% by mass or less from the viewpoint of preventing the lowering of the flux due to the excessively small pore diameter by coating the pore surface with an appropriate thickness.

It is preferable that the time for immersing the base material membrane in the coating liquid is, for example, 1 to 72 hours, and preferably 1 to 24 hours.

The base material membrane immersed in the coating liquid for a predetermined time is deliquored in the deliquoring process in which extra coating liquid adhered to the hollow portion and outer circumference of the membrane is deliquored. The deliquoring method may be a deliquoring method such as a centrifugation method or a suction deliquoring method, and for removing remaining coating liquid, it is preferable to set the centrifugal force during centrifugal operation to 10 G or more and to set the time for centrifugal operation to 10 minutes or longer, and in the case of methods other than centrifugation, it is preferable to adopt deliquoring conditions under which removal efficiency equivalent to the removal efficiency in the centrifugal method described above can be obtained.

For removing coating liquid that has not been removed in the deliquoring process, a washing process may be added after the deliquoring process. By conducting the washing process, the average value T can be adjusted, and specifically the average value T can be made large.

The washing liquid is not particularly limited as long as it is a poor solvent for polysulfone-based polymers, but an aqueous alcohol solution is preferable, and an aqueous methanol solution is more preferable. It is preferable that the concentration of the alcohol in the aqueous solution is 0 to 25% from the viewpoint of peeling of the hydrophilic polymer adhered to the membrane.

The time for the washing process may be appropriately adjusted until a desired average value T is achieved. Moreover, a plurality of washing processes may be conducted until a desired average value T is achieved.

The hollow fiber membrane washed with the washing liquid is deliquored in the deliquoring process in which extra washing liquid adhered to the hollow portion and outer circumference of the membrane is deliquored. The deliquoring method may be a deliquoring method such as a centrifugation method or a suction deliquoring method, and for removing remaining hydrophilic polymers, it is preferable to set the centrifugal force during centrifugal operation to 10 G or more and to set the time for centrifugal operation to 10 minutes or longer, and in the case of methods other than centrifugation, it is preferable to adopt deliquoring conditions under which removal efficiency equivalent to the removal efficiency in the centrifugal method described above can be obtained.

By drying the deliquored membrane, a porous hollow fiber membrane according to the present embodiments can be obtained. The drying method is not particularly limited, but vacuum drying is preferable because it is most efficient.

It is preferable that the inner diameter of the porous hollow fiber membrane is 200 to 400 μm because of ease of processing into a membrane module. Examples of the upper limit of the membrane thickness are 200 μm or less, 150 μm or less in another aspect, 100 μm or less in still another aspect, and 80 μm or less in still another aspect, and examples of the lower limit of the membrane thickness are 20 μm or more, 30 μm or more in another aspect, 40 μm or more in still another aspect, and 50 μm or more in still another aspect.

It is preferable that the dried hollow fiber membrane is subjected to a high-pressure hot-water treatment process. By conducting the high-pressure hot-water treatment process, the average value T can be adjusted, and specifically the average value T can be made large.

The conditions for the high-pressure hot-water treatment process may be appropriately adjusted so as to achieve a desired average value T, but it is preferable that, for example, the membrane is put in a high-pressure steam sterilizer with the membrane fully immersed in water, and is treated at 120° C. or higher for 1 hour or longer. The present high-pressure hot-water treatment process is a high-pressure hot-water treatment process which is conducted after the base material membrane is coated and which is distinctly different from a high-pressure hot-water treatment process that is conducted at 120° C. or higher for 2 to 6 hours in a stage before the base material membrane is coated. A plurality of high-pressure hot-water treatment processes may be conducted until a desired average value T is achieved. By the high-pressure hot-water treatment process, low-molecular components in hydrophilic polymer molecules applied to the membrane are removed, so that the amount of elutes from the membrane can be reduced, and fine pores in the membrane can also be opened.

By drying the membrane subjected to high-pressure hot-water treatment, a porous hollow fiber membrane according to the present embodiments can be obtained. The drying method is not particularly limited, but vacuum drying is preferable because it is most efficient.

Only one of the washing process and the high-pressure hot-water treatment process may be conducted, or both of these processes may be conducted.

(Method for Producing Flat Membrane)

Using the above-described membrane-forming dope, a flat membrane is formed through the following processes.

The membrane-forming dope can be cast onto a support using any of various casting apparatuses known in the art. The support is not particularly limited as long as it is a material having no problem in formation of a membrane, and in one embodiment, examples of the support include non-woven fabrics.

The cast membrane is made to pass through a dry portion having a predetermined length if necessary, then guided into a coagulation bath, and immersed and coagulated. An example of the temperature of the membrane-forming dope during casting is in the range of 25° C. or higher and 50° C. or lower. An example of the thickness of the porous membrane is 20 μm or more and 100 μm or less.

The membrane-forming dope cast onto the support comes into contact with the coagulated liquid, and is coagulated to form a porous membrane. As the coagulated liquid, a non-solvent, or a mixed solution containing a non-solvent and a solvent can be used. Here, it is preferable that water is used as the non-solvent and a solvent used during preparation of the dope is used as the solvent. For example, when NMP is used as the solvent for the membrane-forming dope and NMP/water is used as the good solvent/non-solvent for the coagulated liquid, it is preferable that the coagulated liquid is constituted from NMP and water. An example of the content of the non-solvent in the coagulated liquid is in the range of 50 wt % or more and 95 wt % or less. An example of the temperature of the coagulated liquid is in the range of 10° C. or higher and 40° C. or lower.

The form in which the dope is brought into contact with the coagulated liquid is not particularly limited as long as the coagulated liquid and the membrane-forming dope cast onto the support come into contact with each other sufficiently to enable coagulation. The form may be a liquid bath form in which the coagulated liquid is accumulated. Further, in the liquid bath, a liquid whose temperature and composition are adjusted may be circulated or renewed if necessary. The liquid bath form is most suitable, but in some cases, the liquid may flow through a tube, or the coagulated liquid may be sprayed with a spray or the like.

The membrane after contacting the coagulated liquid is brought into contact with a liquid that is a non-solvent for membrane materials, thereby removing solvents. If the membrane is dried while containing solvents, there is a possibility that solvents are concentrated in the membrane during drying, so that the polysulfone-based polymer is dissolved or swollen, resulting in change of the membrane structure.

Examples of the non-solvent used include water, alcohols and mixtures thereof, and for enhancing the washing efficiency, an example of the temperature of the non-solvent is 50° C. or higher.

For performing washing sufficiently, an example of the retention time of the membrane in the washing bath is 10 to 300 seconds.

The washed membrane is dried to complete a base material membrane containing a polysulfone-based polymer. The drying method is air drying, vacuum drying, hot air drying or the like, and is not particularly limited.

In one embodiment, the base material membrane is made into a bundle, and brought into contact with a liquid in which a hydrophilic polymer is dissolved (sometimes referred to as a coating liquid), thereby imparting hydrophilicity to the base material membrane. The form in which the base material membrane is brought into contact with the coating liquid is not particularly limited as long as desired hydrophilicity is imparted to the base material membrane. The form may be a liquid bath form in which the coating liquid is accumulated. Further, in the liquid bath, a liquid whose temperature and composition are adjusted may be circulated or renewed if necessary. The liquid bath form is most suitable, but in some cases, the liquid may flow through a tube.

The membrane after contacting the coating liquid may be washed through a washing process. By conducting the washing process, the average value T can be adjusted, and specifically the average value T can be made large.

The washing liquid is not particularly limited as long as it is a poor solvent for polysulfone-based polymers, but an aqueous alcohol solution is preferable, and an aqueous methanol solution is more preferable. It is preferable that the concentration of the alcohol in the aqueous solution is 0 to 25% from the viewpoint of peeling of the hydrophilic polymer adhered to the membrane.

The time for the washing process may be appropriately adjusted until a desired average value T is achieved. Moreover, a plurality of washing processes may be conducted until a desired average value T is achieved.

The membrane after the washing process is dried by air drying, vacuum drying, hot air drying or the like.

It is preferable that the membrane after drying is subjected to a high-pressure hot-water treatment process. By conducting the high-pressure hot-water treatment process, the average value T can be adjusted, and specifically the average value T can be made large.

The conditions for the high-pressure hot-water treatment process may be appropriately adjusted so as to achieve a desired average value T, but it is preferable that, for example, the membrane is put in a high-pressure steam sterilizer with the membrane fully immersed in water, and is treated at 120° C. or higher for 1 hour or longer. A plurality of high-pressure hot-water treatment processes may be conducted until a desired average value T is achieved. By the high-pressure hot-water treatment process, low-molecular components in hydrophilic polymer molecules applied to the membrane are removed, so that the amount of elutes from the membrane can be reduced, and fine pores in the membrane can also be opened.

Only one of the washing process and the high-pressure hot-water treatment process may be conducted, or both of these processes may be conducted.

The membrane subjected to high-pressure hot-water treatment is dried by a drying method such as air drying, vacuum drying or hot air drying, whereby a porous membrane according to the present embodiments can be obtained.

EXAMPLES

Hereinafter, the present invention will be described in detail with Examples, but the present invention is not limited to Examples below. Test methods shown in Examples are as follows.

(1) Measurement of Inner Diameter and Membrane Thickness

The inner diameter and membrane thickness of a porous hollow fiber membrane are determined by taking an image of a vertical torn cross section of the porous hollow fiber membrane with a stereoscopic microscope. The membrane thickness is defined as (outer diameter−inner diameter)/2.

Moreover, the membrane area is calculated from the inner diameter and effective length of the membrane.

The membrane thickness of a flat membrane is determined by taking an image of a vertical torn cross section of the flat membrane with a stereoscopic microscope.

(2) Measurement of Ratio of Number of Counts of Ions

The porous hollow fiber membrane is wrapped with powder paper, and sandwiched between glass slides to flatten the membrane, and the number of counts of hydrophobic polymer-derived ions on an outer surface of the porous hollow fiber membrane is then measured using a TOF-SIMS apparatus (nano-TOF manufactured by ULBAC-PHI INCORPORATED), where one outer surface of the flattened hollow fiber membrane is defined as a measurement surface. As a portion analyzed in the follow fiber membrane, a second part of the hollow fiber membrane formed with the membrane made into a bundle and divided into three equal parts is cut out by about 1 cm in a fiber length direction, and subjected to analysis. The measurement conditions are set to primary ion: $Bi_3^{++}$, accelerating voltage: 30 kV, current: about 0.1 nA (as DC), analysis area: 600 μm×600 μm, and cumulative time: 30 min, and a spectrum is detected by a detector using an ion most representative of the hydrophobic polymer ($C_6H_4O$ (m/z=92) in Examples and Comparative Examples below) as a detection ion. In terms of the characteristics of this measurement apparatus, the measurement depth corresponds to 1 to 2 nm from the surface. The number of counts of hydrophilic polymer-derived ions is measured under similar measurement conditions, where detection is performed using an ion most representative of the hydrophilic polymer ($C_4H_5O_2$ (m/z=85) in Examples and Comparative Examples below). The resolution of the analysis area during measurement is defined as 256×256 pixels. Measured data is processed using WincadenceN being on-board software. The resolution of the analysis area during data processing is defined as 256×256 pixels. A ratio of the number of counts of hydrophilic polymer-derived ions (Ti) to the number of counts of hydrophobic polymer-derived ions (To) ($T^1$=Ti/To), which is detected from a rectangular region of 1 pixel in a circumferential direction of the hollow fiber membrane and 400 μm in a fiber length direction of the hollow fiber membrane, is determined. An average value ($T^A$) of the values of $T^1$ from one end to the other end of the hollow fiber in the circumferential direction in the analysis area in TOF-SIMS is calculated. Moreover, an average value ($T^B$) of $T^1$ is also determined by a similar method for the other outer surface corresponding to the back of the above-described one outer surface. Here, as a measurement portion, a position at a distance of about 1 to 2 cm from the measurement portion on the above-described one outer surface in the fiber length direction may be adopted. T is determined by taking the average of $T^A$ and $T^B$. Here, the end of the hollow fiber in the analysis area is defined as a portion at which the average intensity of hydrophobic polymer-derived ions on the outer surface of hollow fiber is less than 80% of the average value of the intensities of hydrophobic polymer-derived ions in 50 pixels at the center of the outer surface of hollow fiber.

How the average value T is determined will be described in more detail. First, a ratio of the number of counts of hydrophilic polymer-derived ions (Ti″) to the number of counts of hydrophobic polymer-derived ions (To″) (T″=Ti″/To″), which is detected from a rectangular region of 1 pixel in the circumferential direction of the hollow fiber membrane and 400 μm in a fiber length direction of the hollow fiber membrane, is determined. Here, n is the number of rectangular regions, where in the analysis area in TOF-SIMS, an end of the hollow fiber membrane in a direction orthogonal to the traveling direction of the membrane during membrane-forming is the first rectangular region, and the other end is the nth rectangular region. After all values of $T^1$ to T″ are determined, an average value ($T^A$) of the values of $T^1$ to T″ is calculated. Moreover, an average value ($T^B$) of $T^1$ to T″ is also determined by a similar method for the other outer surface corresponding to the back of the above-described one outer surface. Here, as a measurement portion, a position at a distance of about 1 to 2 cm from the measurement portion on the above-described one outer surface in the fiber length direction may be adopted. T is determined by taking the average of $T^A$ and $T^B$.

The length of one side of the analysis area may be appropriately set to 1 time or more and less than 1.5 times the length between both ends of the flattened hollow fiber membrane in the circumferential direction, and is preferably, for example, 1.2 times the length between both ends of the flattened hollow fiber membrane in the circumferential direction. Moreover, for determining T″, the length of the rectangular region in the fiber length direction may be ⅔ of the visual field of analysis or longer, and is preferably, for example, ⅔ of the visual field of analysis.

Moreover, the number of counts of hydrophobic polymer-derived ions on a surface of the flat membrane may be measured similarly to the case of the hollow fiber membrane, but the operation of wrapping the membrane with powder paper and flattening the membrane is not necessary. As a portion analyzed in the flat membrane, any portion of the formed flat membrane is selected. The measurement conditions, the analysis area and the cumulative time are similar to those for the hollow fiber membrane. In the case of the flat membrane, a ratio of the number of counts of hydrophilic polymer-derived ions (Ti″) to the number of counts of hydrophobic polymer-derived ions (To″) (T″=Ti″/To″), which is detected from a rectangular region of 1 pixel in a direction orthogonal to a traveling direction of the flat membrane in membrane-forming and 400 μm in the traveling direction of the flat membrane during membrane-forming. Here, n is the number of rectangular regions, where in the analysis area in TOF-SIMS, an end of the flat membrane in a direction orthogonal to the traveling direction of the membrane during membrane-forming is the first rectangular region, and the other end is the nth rectangular region. For example, when the membrane exists over the entire analysis area, n is 256. After all values of $T^1$ to T″ are determined, an average value ($T^A$) of the values of $T^1$ to T″ is calculated. Moreover, an average value ($T^B$) of $T^1$ to T″ is also determined by a similar method for the other surface. Here, as a measurement portion, a position at a distance of about 1 to 2 cm from the measurement portion on the above-described one outer surface in the traveling direction during flat membrane-forming may be adopted. T is determined by taking the average of $T^A$ and $T^B$.

(3) Measurement of Water Permeability

The amount of pure water of 25° C. filtered is measured by dead-end filtration at a constant pressure of 1.0 bar using a membrane module fabricated so as to have an effective membrane area of 3 cm², and the water permeability is calculated from the filtration time.

(4) Measurement of Bubble Point

The downstream surface side of filtration of a membrane in a membrane module fabricated so as to have an effective membrane area of 0.7 cm² is filled with hydrofluoroether, the pressure is then increased with compressed air from the upstream side of filtration in a dead-end system, and the pressure when generation of a bubble is confirmed from the downstream surface side of filtration (when flow rate of air reached 2.4 mL/min) is determined as the bubble point.

(5) Filtration Test of Immunoglobulin

A membrane fabricated so as to have an effective membrane area of 3 cm² is subjected to high-pressure steam sterilization treatment at 122° C. for 60 minutes. A solution is prepared using Venoglobulin IH 5% I.V. (2.5 g/50 ml) commercially available from Mitsubishi Tanabe Pharma Corporation so as to have an immunoglobulin concentration of 15 g/L, a sodium chloride concentration of 0.1 M, and a pH of 4.5. The prepared solution is subjected to dead-end filtration at a constant pressure of 2.0 bar for 180 minutes.

The integrated permeability of immunoglobulin for 180 minutes is calculated from the amount of the filtrate collected for 180 minutes, the concentration of the immunoglobulin in the filtrate, and membrane area of the filter.

(6) Measurement of Porcine Parvovirus Clearance (6-1) Preparation of Filtration Solution A solution is prepared using Venoglobulin IH 5% I.V. (2.5 g/50 ml) commercially available from Mitsubishi Tanabe Pharma Corporation so as to have an immunoglobulin concentration of 15 g/L, a sodium chloride concentration of 0.1 M, and a pH of 4.5. A solution obtained by spiking 0.5% by volume of a porcine parvovirus (PPV) solution to the prepared solution is used as a filtration solution.

(6-2) Sterilization of Membrane

A membrane fabricated so as to have an effective membrane area of 3 cm² is subjected to high-pressure steam sterilization treatment at 122° C. for 60 minutes.

(6-3) Filtration

The solution prepared in (1) is subjected to dead-end filtration at a constant pressure of 2.0 bar for 180 minutes.

(6-4) Virus Clearance

The titer ($TCID_{50}$ value) of the filtrate obtained by filtering the filtration solution is measured by a virus assay. The virus clearance of the PPV is calculated from LRV=Log ($TCID_{50}$)/mL (filtration solution))−Log ($TCID_{50}$)/mL (filtrate)).

It is to be noted that a porous hollow fiber membrane according to one aspect of the present invention which has a coating ratio of about 10% as shown in Example 2 below has been confirmed to have a LRV of more than 5.

Example 1

A solution obtained by mixing 24 parts by mass of PES (ULTRASON® E 6020 P manufactured by BASF SE), 31 parts by mass of NMP (manufactured by Kishida Chemical Co., Ltd.), and 45 parts by mass of TriEG (manufactured by Kanto Chemical Co., Inc.) under reduced pressure was used as a membrane-forming dope. The membrane-forming dope was ejected from an annular portion of a double tube nozzle and a mixed liquid of 77 parts by mass of NMP and 23 parts by mass of water was ejected as a bore liquid from a central portion. The ejected membrane-forming dope and bore liquid were introduced in a coagulation bath containing a coagulation liquid of 15 parts by mass of NMP and 85 parts by mass of water and having a temperature of 18.5° C. through a sealed air gap portion.

The membrane pulled out from the coagulation bath was wound in water with a reel. The spinning speed was set to 5 m/min, and the draft ratio was set to 1.79.

The wound membrane was cut at both ends of the reel, made into a bundle and held at both ends by a support not to loosen. The membrane was subjected to high-pressure hot-water treatment under a condition of 128° C. for 6 hours, and thereafter dried under reduced pressure to obtain a hollow fiber base material membrane.

The obtained hollow fiber base material membrane was made into a bundle, immersed in a coating liquid containing 1.7 parts by mass of polyhydroxyethyl methacrylate (produced using 2-hydroxyethyl methacrylate (manufactured by Kanto Chemical Co., Inc.), the same applies hereinafter) having a weight average molecular weight of 120,000 and 98.3 parts by mass of methanol (manufactured by Wako Pure Chemical Industries, Ltd., the same applies hereinafter) for 20 hours, and thereafter subjected to centrifugal deliquoring at 537 G for 10 minutes. The fiber bundle after deliquoring was dried under reduced pressure for 20 hours. The fiber bundle after vacuum drying was subjected to high-pressure hot-water treatment under a condition of 128° C. for 60 minutes, and the fiber bundle after the treatment was immersed in water at 20° C. for 20 hours. The high-pressure hot-water treatment and water immersion operation were conducted again, and the fiber bundle was dried under reduced pressure for 20 hours to obtain a hollow fiber porous membrane.

It was confirmed that four fibers were easily taken out from the obtained fiber bundle, and membrane adhesion did not occur.

Example 2

A hollow fiber porous membrane was obtained in the same manner as in Example 1 except that the fiber bundle after centrifugal deliquoring was washed with a washing liquid containing 15 parts by mass of methanol and 85 parts by mass of water at a flow rate of 350 ml/min for 60 minutes, and the fiber bundle after washing was subjected to centrifugal deliquoring again at 537 G for 10 minutes.

Example 3

A hollow fiber porous membrane was obtained in the same manner as in Example 2 except that high-pressure hot-water treatment and water immersion treatment were not conducted.

Example 4

A hollow fiber porous membrane was obtained in the same manner as in Example 1 except that the composition of the coating liquid was changed to 1.1 parts by mass of polyhydroxyethyl methacrylate and 98.9 parts by mass of methanol.

Example 5

A hollow fiber porous membrane was obtained in the same manner as in Example 4 except that the fiber bundle after centrifugal deliquoring was washed with a washing liquid containing 15 parts by mass of methanol and 85 parts by mass of water at a flow rate of 350 ml/min for 60 minutes, and the fiber bundle after washing was subjected to centrifugal deliquoring again at 537 G for 10 minutes.

Example 6

A hollow fiber porous membrane was obtained in the same manner as in Example 1 except that the composition of the coating liquid was changed to 2.3 parts by mass of polyhydroxyethyl methacrylate and 97.7 parts by mass of methanol.

Example 7

A hollow fiber porous membrane was obtained in the same manner as in Example 6 except that the fiber bundle after centrifugal deliquoring was washed with a washing liquid containing 15 parts by mass of methanol and 85 parts by mass of water at a flow rate of 350 ml/min for 60 minutes, and the fiber bundle after washing was subjected to centrifugal deliquoring again at 537 G for 10 minutes.

Example 8

A hollow fiber porous membrane was obtained in the same manner as in Example 1 except that the composition of the coating liquid was changed to 5.0 parts by mass of polyhydroxyethyl methacrylate and 95.0 parts by mass of methanol, the fiber bundle after centrifugal deliquoring was washed with a washing liquid containing 15 parts by mass of methanol and 85 parts by mass of water at a flow rate of 350 ml/min for 60 minutes, and the fiber bundle after washing was subjected to centrifugal deliquoring again at 537 G for 10 minutes.

Example 9

A hollow fiber porous membrane was obtained in the same manner as in Example 8 except that the composition of the coating liquid was changed to 10.0 parts by mass of polyhydroxyethyl methacrylate and 90.0 parts by mass of methanol.

Example 10

A hollow fiber porous membrane was obtained in the same manner as in Example 8 except that the composition of the coating liquid was changed to 15.0 parts by mass of polyhydroxyethyl methacrylate and 85.0 parts by mass of methanol.

Example 11

A hollow fiber porous membrane was obtained in the same manner as in Example 2 except that the deliquoring operation was performed with a vacuum ejector, where the pressure for supply of compressed air to the vacuum ejector was set to 0.4 MPa and the deliquoring time was set to 10 minutes, and the washing liquid deliquoring operation was performed with a vacuum ejector, where the pressure for supply of compressed air to the vacuum ejector was set to 0.4 MPa and the deliquoring time was set to 10 minutes.

Example 12

The membrane-forming dope described in Example 1 is applied to a non-woven fabric made of polyester, and the membrane-forming dope is coagulated by introducing the non-woven fabric into a coagulation bath at 18.5° C. containing a coagulation liquid constituted from 15 parts by mass of NMP and 85 parts by mass of water, and thereafter subjected to hot air drying continuously to obtain a base material membrane. The flat membrane after hot air drying is made into a bundle, and introduced into a liquid bath containing coating liquid containing 1.7 parts by mass of polyhydroxyethyl methacrylate (produced using 2-hydroxyethyl methacrylate (manufactured by Kanto Chemical Co., Inc.), the same applies hereinafter) having a weight average molecular weight of 120,000 and 98.3 parts by mass of methanol (manufactured by Wako Pure Chemical Industries, Ltd., the same applies hereinafter). The flat membrane pulled out from the liquid bath is dried under reduced pressure, the membrane bundle after the vacuum drying is subjected to high-pressure hot-water treatment under a condition of 128° C. for 60 minutes, and the membrane bundle after the high-pressure hot-water treatment is dried under reduced pressure to obtain a flat surface.

Comparative Example 1

A hollow fiber porous membrane was obtained in the same manner as in Example 1 except that high-pressure hot-water treatment and water immersion after deliquoring of coating liquid were not conducted. This is a porous membrane corresponding to Example 1 in Patent Literature 1.

Fiber adhesion occurred in the fiber bundle after the vacuum drying, and there was an operation requiring careful considerations such that the fibers are torn off without damaging the fibers in the operation of taking out the fibers from the fiber bundle during preparation of the membrane module. Therefore, operation efficiency was considerably deteriorated.

Comparative Example 2

A hollow fiber porous membrane was obtained in the same manner as in Example 4 except that high-pressure hot-water treatment and water immersion after deliquoring of coating liquid were not conducted.

Fiber adhesion occurred in the fiber bundle after the vacuum drying, and there was an operation requiring careful considerations such that the fibers are torn off without damaging the fibers in the operation of taking out the fibers from the fiber bundle during preparation of the membrane module. Therefore, operation efficiency was considerably deteriorated.

Comparative Example 3

A hollow fiber porous membrane was obtained in the same manner as in Example 6 except that high-pressure hot-water treatment and water immersion after deliquoring of coating liquid were not conducted.

Fiber adhesion occurred in the fiber bundle after the vacuum drying, and there was an operation requiring careful considerations such that the fibers are torn off without damaging the fibers in the operation of taking out the fibers from the fiber bundle during preparation of the membrane module. Therefore, operation efficiency was considerably deteriorated.

Results of Measurement (1) to (5) for the porous hollow fiber membranes obtained in Examples 1 to 11 and Comparative Examples 1 to 3 are shown in Table 1. "-" in Table 1 means unmeasured items.

TABLE 1

| | | Example 1 | Example 2 | Example 3 | Example 4 | Example 5 | Example 6 | Example 7 | Example 8 |
|---|---|---|---|---|---|---|---|---|---|
| Concentration of hydrophilizing agent (wt %) | | 1.7 | 1.7 | 1.7 | 1.1 | 1.1 | 2.3 | 2.3 | 5 |
| Concentration of solvent | | 98.3 | 98.3 | 98.3 | 98.9 | 98.9 | 97.7 | 97.7 | 95 |
| Deliquoring of coating liquid | Method | Centrifugal deliquoring | Centrifugal deliquoring | Centrifugal deliquoring | Centrifugal deliquoring | Centrifugal deliquoring | Centrifugal deliquoring | Centrifugal deliquoring | Centrifugal deliquoring |
| | Time (min) | 10 | 10 | 10 | 10 | 10 | 10 | 10 | 10 |
| Washing treatment | With or without washing | Without washing | With washing | With washing | Without washing | With washing | Without washing | With washing | With washing |

TABLE 1-continued

|  |  | treatment | treatment | treatment | treatment | treatment | treatment | treatment | treatment | treatment |
|---|---|---|---|---|---|---|---|---|---|---|
|  | Concentration of solvent (wt %) | — | 15 | 15 | — | 15 | — | 15 | 15 |  |
|  | Washing Time (min) | — | 60 | 60 | — | 60 | — | 60 | 60 |  |
| Deliquoring of washing liquid | Method | — | Centrifugal deliquoring | Centrifugal deliquoring | — | Centrifugal deliquoring | — | Centrifugal deliquoring | Centrifugal deliquoring |  |
|  | Time (min) | — | 10 | 10 | — | 10 | — | 10 | 10 |  |
| Autoclave treatment | With or without autoclave treatment | With autoclave treatment | With autoclave treatment | Without autoclave treatment | With autoclave treatment | With autoclave treatment | With autoclave treatment | With autoclave treatment | With autoclave treatment |  |
|  | Temperature (° C.) | 128 | 128 | — | 128 | 128 | 128 | 128 | 128 |  |
|  | Time (min) | 60 | 60 | — | 60 | 60 | 60 | 60 | 60 |  |
|  | Membrane adhesion | None | None | None | None | None | None | None | None |  |
|  | Inner diameter (μm) | 273.7 | 273.7 | 273.7 | 274.7 | 274.7 | 272.3 | 272.3 | 275.6 |  |
|  | Membrane thickness (μm) | 39.2 | 39.2 | 39.2 | 39.8 | 39.8 | 40.3 | 40.3 | 40.0 |  |
|  | Ratio of number of counts of ions (T) | 1.6 | 1.55 | 1.65 | 1.35 | 1.15 | 1.6 | 1.65 | 2.3 |  |
|  | Water permeability (LMH) | 278 | 302 | 288 | 310 | 316 | 285 | 288 | 224 |  |
|  | Bubble point (MPa) | 1.72 | 1.74 | 1.74 | 1.72 | 1.74 | 1.68 | 1.76 | 1.72 |  |
|  | Immunoglobulin permeability (kg/m2/3 hr @2 bar) | 7.1 | 8.3 | 7.3 | 5.9 | 5.6 | 8.6 | 8.5 | — |  |
|  | Coating ratio (%) | 9.5 | 10 | 10 | 8.5 | 8.6 | 10.2 | 10.5 | 13.3 |  |

|  |  | Example 9 | Example 10 | Example 11 | Comparative Example 1 | Comparative Example 2 | Comparative Example 3 |
|---|---|---|---|---|---|---|---|
|  | Concentration of hydrophilizing agent (wt %) | 10 | 15 | 1.7 | 1.7 | 1.1 | 2.3 |
|  | Concentration of solvent | 90 | 85 | 98.3 | 98.3 | 98.9 | 97.7 |
| Deliquoring of coating liquid | Method | Centrifugal deliquoring | Centrifugal deliquoring | Suction deliquoring | Centrifugal deliquoring | Centrifugal deliquoring | Centrifugal deliquoring |
|  | Time (min) | 10 | 10 | 10 | 10 | 10 | 10 |
| Washing treatment | With or without washing treatment | With washing treatment | With washing treatment | With washing treatment | Without washing treatment | Without washing treatment | Without washing treatment |
|  | Concentration of solvent (wt %) | 15 | 15 | 15 | — | — | — |
|  | Washing Time (min) | 60 | 60 | 60 | — | — | — |
| Deliquoring of washing liquid | Method | Centrifugal deliquoring | Centrifugal deliquoring | Suction deliquoring | — | — | — |
|  | Time (min) | 10 | 10 | 10 | — | — | — |
| Autoclave treatment | With or without autoclave treatment | With autoclave treatment | With autoclave treatment | With autoclave treatment | Without autoclave treatment | Without autoclave treatment | Without autoclave treatment |
|  | Temperature (° C.) | 128 | 128 | 128 | — | — | — |
|  | Time (min) | 60 | 60 | 60 | — | — | — |
|  | Membrane adhesion | None | None | None | Present | Present | Present |
|  | Inner diameter (μm) | 275.6 | 275.6 | 274.5 | 273.7 | 274.7 | 272.3 |
|  | Membrane thickness (μm) | 40.0 | 40.0 | 40 | 39.2 | 39.8 | 40.3 |
|  | Ratio of number of counts of ions (T) | 6.95 | 6.25 | 1.4 | 0.35 | 0.2 | 0.25 |
|  | Water permeability (LMH) | 101 | 15 | 288 | 273 | 298 | 265 |
|  | Bubble point (MPa) | 1.78 | >1.8 | 1.75 | 1.71 | 1.69 | 1.74 |
|  | Immunoglobulin permeability (kg/m2/3 hr @2 bar) | — | — | 9.1 | 7.95 | 7.35 | 8.4 |
|  |  | 18.2 | 22.2 | 9.1 | 9.5 | 8.5 | 10.2 |

INDUSTRIAL APPLICABILITY

The porous membrane according to the present invention can suitably be used in purification of fractionated plasma products, biopharmaceuticals, and so on, and therefore has industrial applicability.

The invention claimed is:

1. A method for producing a porous membrane that includes a hydrophobic polymer and a hydrophilic polymer, or for reducing membrane adhesion after hydrophilizing, the method comprising:

a hydrophilization process of hydrophilizing a base material membrane comprising a hydrophobic polymer by coating the base material membrane with a hydrophilic polymer to obtain a hydrophilized porous membrane, wherein the hydrophilic polymer is a methacrylate-based polymer; and an adjustment process of treating the hydrophilized porous membrane so that an average value T of ratios of the number of counts of ions derived from the hydrophilic polymer to the number of counts of ions derived from the hydrophobic polymer is 1.0 or more based on a time-of-flight secondary ion mass spectrometry (TOF-SIMS) measurement of a surface of the porous membrane, wherein the ions derived from the hydrophilic polymer are $C_4H_5O_2$ (m/z=85) ions, and wherein the adjustment process comprises subjecting the hydrophilized porous membrane to high-pressure hot-water treatment in a state where the membrane is completely immersed in hot water and the temperature of the hot water is 120° C. or higher.

2. The method according to claim 1, wherein the hydrophilization process comprises a process of making the base material membrane into a bundle and performing hydrophilization treatment.

* * * * *